(12) United States Patent
Galula et al.

(10) Patent No.: US 12,438,894 B2
(45) Date of Patent: Oct. 7, 2025

(54) SYSTEM AND METHOD FOR PROVIDING FLEET CYBER-SECURITY

(71) Applicant: PlaxidityX Ltd, Ramat Gan (IL)

(72) Inventors: Yaron Galula, Kadima (IL); Ofer Ben-Noon, Rishon-LeZion (IL)

(73) Assignee: PlaxidityX Ltd, Ramat Gan (IL)

( * ) Notice: Subject to any disclaimer, the term of this patent is extended or adjusted under 35 U.S.C. 154(b) by 0 days.

(21) Appl. No.: 15/992,257

(22) Filed: May 30, 2018

(65) Prior Publication Data
US 2018/0351980 A1   Dec. 6, 2018

Related U.S. Application Data

(60) Provisional application No. 62/512,187, filed on May 30, 2017.

(51) Int. Cl.
| | |
|---|---|
| *H04L 29/06* | (2006.01) |
| *G06F 21/55* | (2013.01) |
| *H04L 9/40* | (2022.01) |
| *H04W 4/44* | (2018.01) |
| *H04W 12/12* | (2021.01) |
| *H04L 43/062* | (2022.01) |
| *H04L 67/12* | (2022.01) |
| *H04W 12/63* | (2021.01) |

(52) U.S. Cl.
CPC ........ *H04L 63/1425* (2013.01); *G06F 21/552* (2013.01); *H04L 63/1416* (2013.01); *H04W 4/44* (2018.02); *H04W 12/12* (2013.01); *H04L 43/062* (2013.01); *H04L 63/1433* (2013.01); *H04L 67/12* (2013.01); *H04W 12/63* (2021.01)

(58) Field of Classification Search
CPC ............. H04L 63/1425; H04L 63/1416; H04L 63/1433; H04L 43/062; H04L 67/12; H04W 4/44; H04W 12/12; H04W 12/00503; G06F 21/552
See application file for complete search history.

(56) References Cited

U.S. PATENT DOCUMENTS

| | | | |
|---|---|---|---|
| 2014/0358839 A1* | 12/2014 | Dhurandhar | G01D 4/00 706/46 |
| 2015/0113638 A1* | 4/2015 | Valasek | G06F 21/562 726/22 |
| 2015/0195297 A1* | 7/2015 | Ben Noon | H04L 67/12 726/22 |
| 2017/0200323 A1 | 7/2017 | Allouche et al. | |
| 2017/0230385 A1 | 8/2017 | Ruvio et al. | |
| 2018/0275648 A1* | 9/2018 | Ramalingam | G01C 21/3438 |
| 2018/0316701 A1* | 11/2018 | Holzhauer | H04L 63/1433 |
| 2019/0036946 A1* | 1/2019 | Ruvio | H04W 12/10 |
| 2019/0141070 A1* | 5/2019 | Tsurumi | B60R 16/0232 |

OTHER PUBLICATIONS

Non-Final Office Action mailed Mar. 12, 2025 from related U.S. Appl. No. 18/754,170.

\* cited by examiner

*Primary Examiner* — Evans Desrosiers

(57) ABSTRACT

A system and method for providing fleet cyber-security comprising may include collecting, by a plurality of data collection units installed in a respective plurality of vehicles in the fleet, information related to cyber security and including the information in reports to a server. Data in reports may be aggregated, by the server. A cyber-attack may be identified based on aggregated data.

20 Claims, 3 Drawing Sheets

SYSTEM AND METHOD FOR PROVIDING FLEET CYBER-SECURITY

CROSS-REFERENCE TO RELATED APPLICATIONS

This application claims the benefit of U.S. Provisional Patent Application No. 62/512,187 entitled "SYSTEM AND METHOD FOR PROVIDING FLEET CYBER-SECURITY", filed on May 30, 2017, which is incorporated herein by reference in its entirety.

FIELD OF THE INVENTION

The present invention relates generally to security. More specifically, the present invention relates to providing cyber-security to a fleet of vehicles.

BACKGROUND

The automotive industry has, initially slowly, and subsequently with great rapidity, been evolving from using mechanical control systems that control a vehicle's functions to electronic "drive by wire" control systems for controlling the vehicle's functions. In mechanical vehicular control systems, the driver of a vehicle controls components of a vehicle that control vehicle functions by operating mechanical systems that directly couple the driver to the components via mechanical linkages. In drive by wire vehicle control systems, a driver may be coupled directly, and/or very often indirectly, to vehicle control components that control vehicle functions by electronic control systems and electronic wire and/or wireless communication channels, rather than by direct mechanical linkages. The driver controls the control components by generating electronic signals that are input to the communication channels and to the electronic control systems.

The introduction of computerized components into vehicles exposes vehicles to cyber threats. For example, a hacker can gain control of various components in a vehicle and/or gain control of a fleet of vehicles. According, there is a need for a system and method to protect vehicles and fleets from cyber-attacks, risks and threats.

SUMMARY

A system and method for providing fleet cyber-security comprising may include collecting, by a plurality of data collection units (DCUs) installed in a respective plurality of vehicles in the fleet, information related to cyber security and including the information in reports to a server. Data in reports may be aggregated, by the server. A cyber-attack may be identified based on aggregated data.

An embodiment may include collecting, by a plurality of DCUs installed in a respective plurality of vehicles in the fleet, information related to cyber security and including the information in reports to a server; and aggregating, by the server, reports from the plurality of DCUs and identifying, based on aggregated reports, that at least one of: the fleet and a vehicle in the fleet is under a cyber-attack.

An embodiment may include identifying the cyber-attack based on at least one of for example correlating, analyzing or cross-referencing information in the reports with data stored on a server and correlating information in the reports with server logs, lists or databases related to a communication of DCUs with the server. An embodiment may include identifying a cyber-attack based on aggregating reports from at least one of: a dealership, a service facility and a component in at least one of the vehicles.

An embodiment may include including, in the reports, codes identifying service entities; and using the received codes to associate a service entity with a cyber threat. An embodiment may include classifying, by the server, an event based on relating the event to one or more recorded events; and identifying a cyber-attack based on the classification. An embodiment may include identifying a false positive detection based on the classification.

An embodiment may include identifying previously undetected threats by correlating historical data with newly identified hacks. An embodiment may include identifying a cyber-threat based on correlating data received from a plurality of DCUs in a vehicle. An embodiment may include including, in the reports, geolocation information; and using the geolocation information to associate a cyber threat with a location. An embodiment may include including, in the reports, connectivity information; and using the connectivity information to associate a cyber threat with a communication entity.

An embodiment may include including, in the reports, weather conditions; and using the weather conditions to identify false positive detection. An embodiment may include obtaining, by a set of sensors units installed in a respective set of vehicles, data related to cyber security and sending the data to a server; and correlating, by the server, data from the plurality of sensors and identifying, based on correlated data, a cyber threat related to at least one of: the fleet and a vehicle in the fleet. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
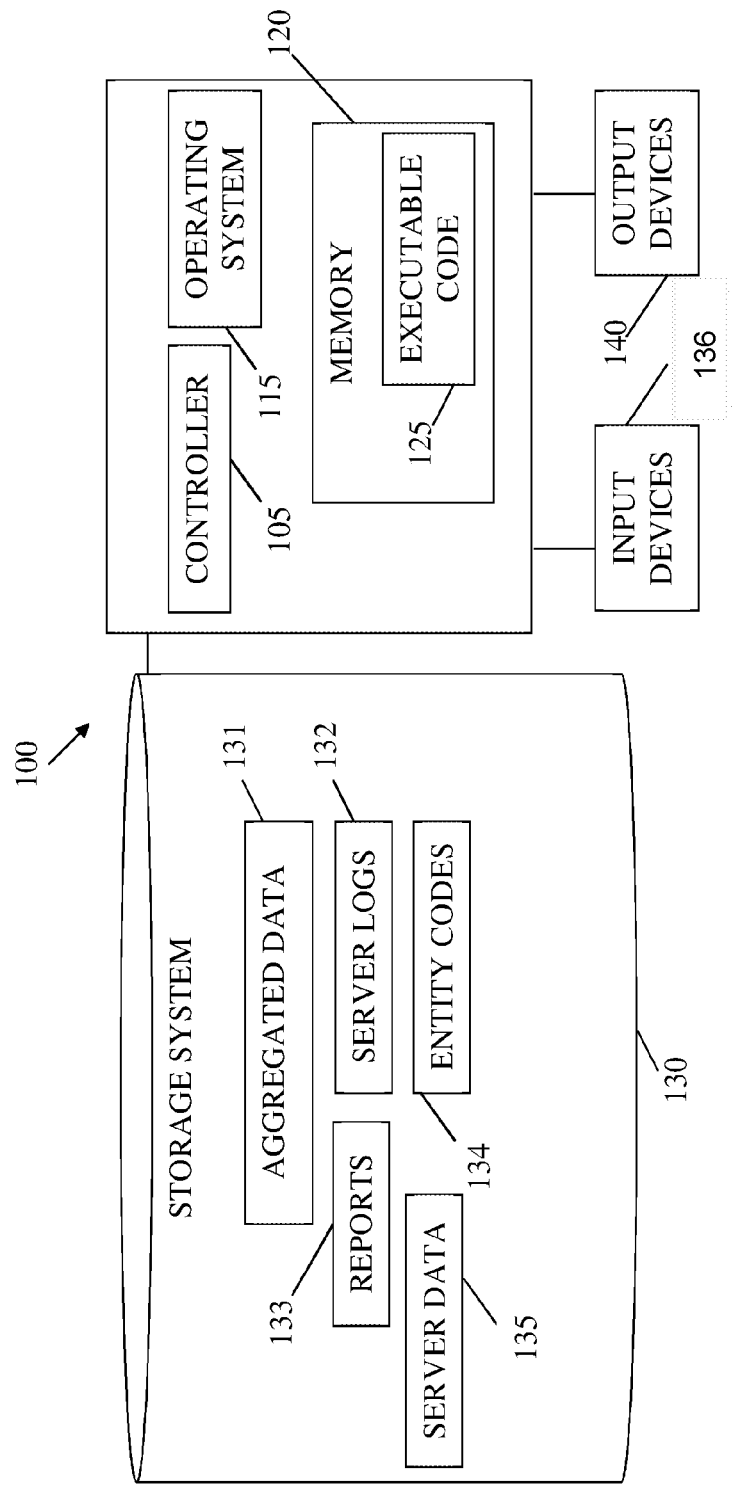
FIG. 1 shows high level block diagram of a computing device according to illustrative embodiments of the present invention.

Reference is made to FIG. 1, showing a high-level block diagram of a computing device according to some embodiments of the present invention. Computing device 100 may include a controller 105 that may a hardware controller. For example, controller 105 may be, or may include, a central processing unit processor (CPU), a chip or any suitable computing or computational device, an operating system 115, a memory 120, executable code 125, a storage system 130, input devices 136 and output devices 140. Controller 105 (or one or more controllers or processors, possibly across multiple units or devices) may be configured (e.g., by executing software or code) to carry out methods described herein, and/or to execute or act as the various modules, units, etc. More than one computing device 100 may be included in, and one or more computing devices 100 may be, or act as the components of, a system according to some embodiments of the invention.

Figure 2:
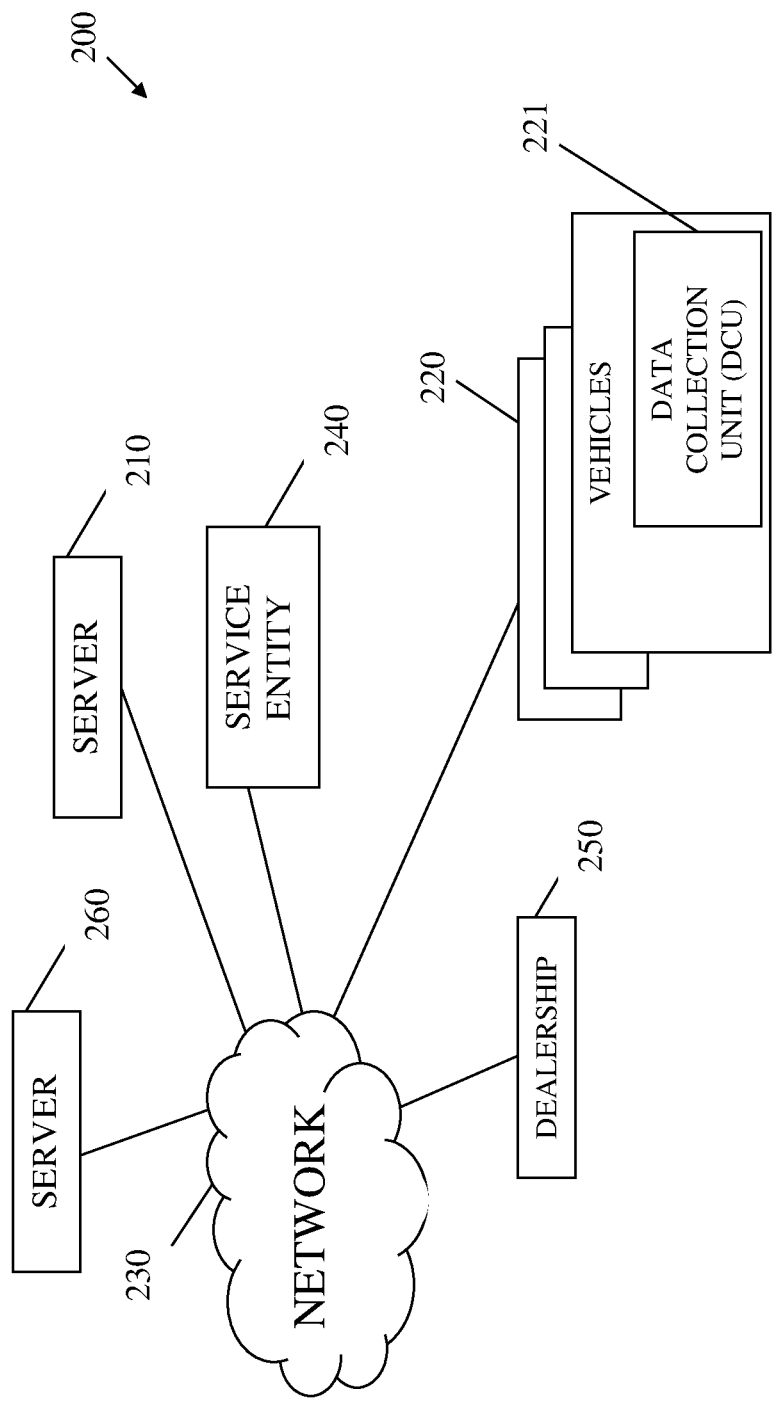
FIG. 2 is an overview of a system according to illustrative embodiments of the present invention.

More than one computing device 100 may be included, and one or more computing devices 100 may act as the various components, for example the components of a system according to some embodiments. For example, server 210 and each of data collection units 221 in vehicles 220 as shown in FIG. 2 and described herein may include computing device 100 or components of computing device 100 For example, by executing executable code 125 stored in memory 120, controllers 105 in each vehicle 220 in a fleet may collect and send data to server 210. More than one server 210 may be included in a system 200. A single or specific vehicle included in a fleet of vehicles 220 may be referred to hereinafter as a vehicle 220. The terms "vehicles 220" and "fleet 220" may mean, or refer to, the same thing, and may be used interchangeably herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. It will be noted that an operating system 115 may be an optional component, e.g., in some embodiments, a system may include a computing device 100 that does not require or include an operating system 115. For example, a security unit in a vehicle may be, or may include, a computing device 100 that includes a microcontroller, an application specific circuit (ASIC), a field programmable array (FPGA) and/or system on a chip (SOC) that may be used, or may operate, without an operating system.

Memory 120 may be a hardware memory. For example, memory 120 may be, or may include, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be any executable code, e.g., an application, a program, a process, task or script. Executable code 125 may be executed by controller 105 possibly under control of operating system 115. For example, executable code 125 may be an application that provides fleet cybersecurity as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein may be, or may include, controller 105, memory 120 and executable code 125.

Storage system 130 may be or may include, for example, a hard disk drive, a disk array, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105.

As shown, storage system may include, or may be used for storing, aggregated data 131, server logs, lists or databases 132, reports 133, entity codes 134 and server data 135. Reports 133 may be or may include any data received from collection units in vehicles as further described herein.

Server logs 132 may include any relevant information, e.g., server logs 132 may include metadata, e.g., metadata may include time of communication with a unit in a vehicle, length of a message received, a component related to a message received by server 210 or other information related to communication of a server with components in vehicles as further described herein. Entity codes 134 may be codes that identify entities (e.g. vehicles, vehicle or other components, automobile parts, vehicle systems such as a steering system or an audio system, etc.), e.g., an entity code may uniquely identify a manufacturer of a component in a vehicle, and/or a serial number of a part or component, or an entity code may identify a service station or a dealership. Server data 135 may be any data stored on a server, e.g., server data 135 may be, or may include, data obtained from the internet, from a user or from a remote server. Aggregated data 131 may be, or may include data generated by a server, e.g., by aggregating and/or correlating data in one or more of: server logs 132, reports 133, entity codes 134 and server data 135 as further described herein.

Aggregated data 131, server logs 132, reports 133, entity codes 134 and server data 135 as referred to herein may be any suitable digital data structure or construct or computer data objects that enables storing, retrieving and modifying values. For example, aggregated data 131, server logs 132, reports 133, entity codes 134 and server data 135 may be files, tables or lists in a database in storage system 130 and may each include a number of fields that can be set or cleared, a plurality of parameters for which values can be set, a plurality of entries that may be modified and so on. Aggregated data 131, server logs 132, reports 133, entity codes 134 and server data 135 may be continuously, periodically or repeatedly updated, e.g., based on information collected by units in vehicles as described herein.

In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 136 may be or may include a mouse, a keyboard, a touch screen or pad or any suitable input device, or a sensor such as an accelerometer, speedometer, thermometer, etc. It will be recognized that any suitable number of input devices may be operatively connected to computing device 100 as shown by block 136. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 136 and 140. For example, a wired or wireless network interface card (NIC), a printer, a universal serial bus (USB) device or external hard drive may be included in input devices 136 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Reference is made to FIG. 2, an overview of a system 200 according to some embodiments of the present invention. As shown, a system 200 may include one or more server(s) 210 and a fleet of vehicles 220 that may communicate over one or more network(s) 230. As shown, at least some of vehicles 220 may include one or more DCU(s) 221. As further shown, system 200 may include, or be operatively connected to, one or more service entities 240 and one or more dealerships 250 (each operating a computing device, e.g. a server). Vehicles 220, DCUs 221, service entities 240 and dealerships 250 may be collectively referred to hereinafter as vehicles 220, service entities 240, dealerships 250 and/or DCUs 221 or individually as a vehicle 220 service entity 240, dealership 250 and/or a DCU 221, merely for simplicity purposes. A service entity 240 may be, for example, a service station or garage, a dealership 250 may be a business that sells vehicles. In some embodiments, computers, servers or computerized equipment in service entities 240 and/or dealerships 250 may communicate, over network 230, with server 210. Server 260 may be a web server or any other suitable server from which server 210 may get information related to traffic, weather and the like. For example, server 260 may be a web server or a server operated by an authority that provides information related to traffic accidents, weather storms, communication systems failures etc.

A DCU 221 may be any applicable unit, e.g., a sensor adapted to obtain information. For example, a DCU 221 may be a sensor or other unit (e.g., a sniffer) adapted to capture messages or packets communicated over an in-vehicle network (e.g., Controller Area Network (CAN) or Ethernet packets, messages or frames) or a DCU 221 may be a sensor or component adapted to obtain information from electronic control units (ECUs) in a vehicle. For example, a DCU 221 may be a unit including a controller 105 that is adapted to, either over an in-vehicle network or using direct line or communication bus, communicate with an ECU and receive, retrieve or otherwise obtain, from the ECU, information as described herein.

In some embodiments, DCU 221 may be included or embedded in an ECU in a vehicle 220. An ECU may be any unit that controls a system or device in a vehicle. System 200 or components of system 200 may include components such as those shown in FIG. 1. For example, server 210 and DCUs 221 in vehicles 220 may include one or more computing devices 100.

Network 230 may be, may comprise or may be part of a private or public internet protocol (IP) network, or the internet, or a combination thereof. Additionally, or alternatively, network 230 may be, comprise or be part of a global system for mobile communications (GSM) network. For example, network 230 may include or comprise an IP network such as the internet, a GSM related network and any equipment for bridging or otherwise connecting such networks as known in the art. In addition, network 230 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 230 are implied but not shown, e.g., access points, base stations, communication satellites, GPS satellites, routers, telephone switches, etc. It will be recognized that embodiments of the invention are not limited by the nature of network 230.

Server 210 may be, or may be included in, a security operations center (SOC) that may manage various aspects related to the cyber-security of fleet 220. Vehicles 220 may include an in-vehicle network that includes one or more electronic control units (ECUs) control components in the in-vehicle network and the in-vehicle network may include one or more security enforcement units (SEUs). For example, an SEU may be, or may include, computing device 100 or an SEU may be, or may include, a microcontroller, an application specific circuit (ASIC), a field programmable array (FPGA) and/or system on a chip (SOC). An SEU may be connected to an in-vehicle network and may be adapted to communicate with ECUs on the in-vehicle network and/or with entities outside a vehicle 220, e.g., an SEU may communicate with server 210 using wireless technology supported by network 230.

Server 210 may receive cyber-security data from a plurality of vehicles in fleet 220, may process received data, store received and/or processed data (e.g., as shown by aggregated data 131) and may use received and/or processed data to determine various aspects related to the cyber-security (or cybersecurity) of fleet 220.

The terms "cyber-security" or "cybersecurity" as used in this application refer to technologies, processes and practices designed to protect networks, computers, programs and data from attack, damage or unauthorized access. Cyber-security data may be any data, information or values related to security. Generally, any event or data captured, generated or identified by units installed in vehicles 220 may be considered cyber-security data. For example, the number, type and content of messages communicated over an in-vehicle network may each or all be considered cyber-security data. Any data received, generated or created by server 210 may be considered cyber-security data. It is noted that server 210 may determine or identify aspects related to cyber-security and/or cyber-security and may further identify aspects related to physical security (e.g., identify or determine that a physical component was disconnected from an in-vehicle network).

As known and referred to in the art, false positives are falsely or wrongly identified or determined events or errors: e.g. the events are determined to exist or to have occurred, when they have not occurred or do not exist. For example, due to poor transmission or communication with a vehicle (e.g., due to weather conditions), a system (or server) may falsely determine that a wireless communication component in the vehicle has been hacked or jeopardized.

An embodiment may include a backend system that may receive cyber-security data from vehicles 220, process received data and identify or detect various aspects related to the cyber-security of fleet 220. Server 210 may be, or may be included in, a backend system of system 200. For example, an attack may be identified, possibly in real-time, by server 210 based on cyber-security data received from a plurality of vehicles 220, an attack may be characterized by server 210 based on data received from a plurality of vehicles 220 and so on.

A backend system (e.g., server 210) may fuse or combine data from any source with data received from vehicles 220. For example, server 210 may receive data from the internet, navigation applications or sources and the like. For example, data related to traffic jams, construction, blocked roads and the like may be obtained from server 260 or from any applicable source and may be used, by server 210, in combination with data received from vehicles 220, to reach cyber security related conclusions as described. By combining data received from sources other than vehicles 220 with data received from vehicles 220, server 210 may identify events that cannot otherwise be identified. For example, if server 210 is informed (e.g., by server 260) of a weather storm in a specific area then server 210 may ignore failures to communicate with DCUs in that area, in another example, if a number of accidents are reported in a specific area or road then server 210 may examine data received from DCUs in the area or road in order to determine whether or not the accidents are related to an attack, e.g., one that causes loss of control of a vehicle.

Data received by server 210 from vehicles 220 may include, for example, data captured by cyber security sensors included in vehicles 220. For example, data captured or generated by an intrusion detection and prevention system (IDPS), firewall, remote attestation, secure boot or other logs which may be generated in a vehicle 220 may be uploaded to server 210 either periodically or upon request or upon event. For example, a configuration of an SEU in a vehicle 220 may cause the SEU to upload some data periodically and to further upload some data based on a specific event.

Server 210 may store fleet data (e.g., in aggregated data 131). Fleet data may be created based on data received from a plurality of vehicles 220 and may include, for example, dealership and/or service station visit data, diagnostic feeds, in-vehicle software update logs, ECU logs, GPS location of vehicles, server access logs, service provider data, vehicle software inventory, warranty data, weather reports, user, vehicle, ECU authentication logs (success and/or failure), and so on. It is noted that any data may be captured or generated by a set of SEUs in a respective set of vehicles 220 and the data may be uploaded to server 210 where it may be used to generate and maintain fleet data as described.

Server 210 may fuse, correlate and/or aggregate data from any number of vehicles 220 with data from other sources. For example, data received from dealerships, weather sources, traffic reports, the internet and so on may be fused or combined with data received from vehicles 220 such that various cyber-security conclusions may be derived.

Aggregating data, e.g., by server 210, as described herein may include fusion, combination or aggregation of multiple events of similar type, to understand scope and/or to investigate a source of a cyber-threat. For example, by aggregating or fusing together attacks (or events) coming from a geographical area (e.g., in a radius of a few kilometers), server 210 may identify a geographical area. Server 210 may further, e.g., by examining connectivity logs that include details related to the communication of server 210 with a plurality of DCUs, identify a specific cell tower from which an attack is launched.

In some embodiments, aggregation may include examining, for a set of hacked or attacked vehicles, a manufacturing database (DB) in order to identify or determine whether all vehicles affected by an attack have one or more ECUs manufactured at the same factory and/or at the same date or time, thus a supply chain attack may be identified. For example, the ability to fuse an ECU manufacturing DB (e.g., in server 260) into data available to server 210 can enable server 210 to determine that a virus comes from a specific manufacturer.

Aggregation may include filtering true attacks from false-positives anomalous causes, e.g. ECU malfunction/replacement, minor mismatches between expected behavior and actual vehicle traffic. Aggregation may include cross referencing anomalies with ECU malfunctions (e.g., using ECU logs/diagnostics/Car maintenance logs) and/or comparing a behavior of a vehicle (e.g., as exhibited by network traffic over the in-vehicle network as reported by a DCU with other vehicles exhibiting similar behavior: in this manner false positives may be detected. Accordingly, server 210 may classify anomalies as one of: an attack, a malfunction or a mismatch that may be negligible. Accordingly, server 210 may remove or ignore false positives by comparing data received from DCUs with ECU malfunction databases.

For example, server 210 may log the number or amount of rejected transmission control protocol (TCP) packets due to bad TCP sequence numbers in TCP messages. If the number rises for several vehicles, at the same location, then server 210 may determine this is due to a failed TCP sequence prediction attack, an attack known in the art. Aggregation may include relating/comparing location of service access to/with dealership locations, e.g., to identify if someone is tuning or hacking a vehicle or launching an attack. For example, using geolocation data as described, server 210 can determine that an access to a component in a vehicle is made outside of a dealership, server 210 can identify such access by comparing a dealership visits log and/or GPS location data as described. Aggregation may include searching (e.g., in logs as described) for a plurality of requests originating from a specific or same device (e.g., based on an International Mobile Equipment Identity (IMEI)) that appear to originate from different users.

Aggregation may include fusing, grouping or classifying infotainment logs of attacked cars. For example, if server 210 identifies that, when an attack was launched, the same CD (or other media file) was played in some or all attacked vehicles then server 210 may link or associate the media with the attack. For example, a media file downloaded may contain a virus that started the attack. Accordingly, aggregation may include examining entertainment devices logs at time of attacks across multiple vehicles to identify content or media related to the attack.

Aggregation may include coupling, grouping or classifying logs related to devices' pairing at the time of an attack across multiple vehicles to identify common devices (e.g., smartphone, dongle etc.). For example, if server 210 identifies that vehicles were attacked immediately after a smartphone is paired with a unit in the vehicle (e.g., using BLUETOOTH short-range wireless technology as known in the art) then server 210 may determine that the attack is made via smartphones. Accordingly, by examining a history of devices that were paired with attacked vehicles, server 210 may identify an attack surface, for example, if a type of device is common to all attacked vehicles, a vulnerability in the device may be the attack source. Accordingly, server 210 may identify a source of an attack by aggregation as described. Aggregation may enable server 210 to identify hacked vehicles subscribed to specific connectivity service, e.g., the same carrier or service provider. For example, using connectivity logs as described server 210 may identify that an attack came from a specific service provider. Aggregation may include collecting ECU operational data (boot time etc.) to determine if a hack or attack is in progress.

Correlation as referred to herein may include grouping or classification of multiple events, messages, or reports, possibly of different types. For example, correlation may include grouping multiple events, messages or reports based on geographical current or previous location to understand if it an attack was localized and/or to identify possible attack progress, for example, if all attacked vehicles were in the same location then an attack may have been launched over WiFi or BLUETOOTH short-range wireless technology, such data may further be used to locate the attacker or at least know where the attacker was when the attack was launched.

Correlation may include grouping or relating geolocation data or connectivity logs of multiple hacks to understand if a specific cell tower or other connectivity device is related to all attacks. Correlation may include comparing communication logs (e.g., stored in server 210 as described) to logs in a vehicle and looking for inconsistencies that might suggest an attack. For example, an embodiment may compare server access log with vehicle telematics successful connections log and look for inconsistencies, e.g., if the server log indicates a communication that is not included in the vehicles telematics log then an embodiment may determine this indicates an attack or hacking attempt.

Correlation may include comparing, grouping or relating vehicle logs with an accidents DB, e.g., in server 260. For example, if there is an unlikely pattern shared by some vehicles that were involved in accidents, this could be a covert attack that may be identified by server 210 by elating vehicle logs to data in an accidents DB. For example, if right before an accident, logs in vehicles all show that a communication through a specific cell tower was made then server 210 may determine the cell tower is the source of an attack.

Correlation may include comparing anomalies with weather reports to detect possible false positives and/or faulty ECUs in extreme weather conditions. For example, server 210 may remove or ignore anomalies which are false positive caused by extreme environmental conditions (such as extreme low/high temperatures) by fusing geolocation with weather data feed, e.g., obtained from the internet.

Correlation may include identifying an anomalous behavior of a vehicle to detect that a hacker is trying to gain access to in-vehicle components. For example, if logs indicate a specific vehicle is being turned on and off many times without moving then server 210 may determine someone might be trying to hack the vehicle. Server 210 may look for, in vehicles specific logs and may search for things which might not be indicators alone, or by themselves, but due to scope, state, context or frequency are anomalous, either for a vehicle or from a fleet perspective.

Correlation may include identifying, vehicles with some of the log data being continuous in time and other vehicles with log data that is not continuous, e.g., log data for some time intervals is missing. An increase of the number of vehicles where log data is not continuous may cause server 210 to determine an attack is causing ECU's to malfunction, crash or keep rebooting.

Correlation may include comparing time of attacks with Firmware Over-The-Air (FOTA) activity or log, e.g., to detect that a virus was downloaded with FOTA. In other cases, false positives that may be due to FOTA operations (e.g., an update) may be identified. Identifying an attack is related to FOTA as described may further enable server 210 to identify the source of an attack, e.g., the source may be identified as the entity participating in a FOTA operation. Correlation may include identifying all vehicles involved in telematics related activity at a suspicious time of day, e.g., at a time when an attack is known to have occurred.

Correlation may include performing historical analysis of hacked vehicles once an attack was detected. Usually an attack that has been identified is a part of a larger campaign, and the hacker has used or attempted to use other attacks before. By analyzing historical data of infected vehicles and finding patterns, server 210 may identify vehicles in early phases of the attack, e.g., identify vehicles before they are being completely infected, or server 210 may identify attack attempts, e.g., ones that started but failed. Accordingly, correlation may include looking back at historical data and correlating it with newly identified hacks, to find previously undetected attacks or hacking attempts.

Correlation may include inspecting and correlating data with maintenance records. For example, if server 210 identifies that a large number of vehicles attacked visited the same service shop then server 210 may determine the service shop is the source of the attack. Any service and/or dealership logs may be correlated with any data, e.g., to determine if affected vehicles were serviced in the same dealership thus a source of an attack may be identified as described.

Correlation may include identifying open source components in ECUs in a vehicle and correlate, or cross compare the open source components with known hacks to find vulnerabilities in the ECUs. In some embodiments, if an IDPS reports a likelihood of an attack then server 210 may request or obtain full records from related vehicles, possibly records or logs between specified timespan. For example, in some embodiments, full or complete logs or records that record or store all events in a vehicle may be kept, on-board, in the vehicle and may be provided, on demand, accordingly, an embodiment may perform a complete analysis of historical events. Full or complete records or logs as described may be downloaded from a vehicle in a service facility and sent to server 210 for inspection.

Correlation may include correlating data in a maintenance system with other data described herein. For example, data in a maintenance system (e.g., a warranty DB in server 260) may indicate which of the vehicles are still under warranty, just went out of warranty, accordingly, frauds related to warranty may be detected. Correlation may include correlating data related to network connections with other data described herein. For example, by correlating IP addresses used by attacked vehicles, a specific IP address may be identified as the IP address of an attacker.

Correlation may include correlating applications or programs installed in vehicles. For example, if a specific application was installed in a large number of attacked vehicles then server 210 may determine the attack comes from the application or that the application is otherwise related to the attack (e.g., a hacker found a way to access the vehicle through the application). Of course, server 210 may, in such case, warn users, service facilities or fleet managers, informing them the application exposes vehicles to an attack. To identify that an application is related to an attack, server 210 may examine or correlate logs, e.g., determine the time between downloading the application and beginning of an attack.

Correlation may include, once an attack has been verified, searching for common IP addresses and/or domain name serves (DNSs) in logs to find a source of an attack. Identifying a source of an attack may enable server 210 to identify additional attacks which might still be unnoticed. Any communication logs in multiple vehicles may be examined to identify if attacks are from the same source or place.

In some embodiments, server 210 may cause one or more DCUs to operate in an emergency mode whereby DCUs send full (mirroring) data such that server 210 receives a full report of every event in a selected set of vehicles. In some embodiments, when in emergency mode, DCUs may receive commands from server 210 thus an attack may be actively or proactively handled.

Correlation may include comparing data in logs or reports with vehicles' state during attack. For example, information such as speed, ABS functions, vehicle turning, ADAS working, etc. received by server 210 may be used, by server 210 in order to better identify, classify or otherwise understand the condition in which the attack is executed.

Correlation may include classifying similar/identical attacks by their sequence of anomalies to help identify the attacker. Server 210 may match attack sequence to its vehicle-behavior/driver-experience, e.g. breaks applied, engine stalls, radio volume up, etc. For example, by matching or correlating vehicle-behavior/driver-experience with similar attacks, server 210 can match a sequence of anomalies with a source of an attack. For example, an attack may be identified based on a specific sequence of malfunctions.

Correlation may include matching information in an ownership DB (e.g., in server 260) with other data as described herein. For example, if a set of attacked vehicles all belong the same person or organization then server 210 may determine that the person or organization is under attack and may warn the person or organization. In other cases, if all attacked vehicles were sold by the same dealer then server 210 may determine that the dealer is attacked.

Correlation may include matching connectivity information with other data as described herein. For example, a device (e.g., a BLUETOOTH wireless device, an on-board dongle and the like) may be identified as a source of an attack based on correlating connectivity information with other data as described herein. In other cases, a WiFi or other network may be identified as related to an attack based on correlating connectivity information with other data as described herein.

Correlation may include examining and matching data received from two or more security systems, sensors or components in a vehicle. For example, other than correlating raw data (e.g., data related to engine status or state) with data received from security entities, server 210 may correlate data from two or more firewalls in a vehicle and/or an intrusion detection system. For example, an attack may be identified or characterized based on a report from a first firewall (e.g., reporting an attempt to gain access through a first specific IP port) and based on a report from a second firewall (e.g., reporting an attempt to gain access through a second specific IP port) and additionally based on a report from an intrusion detection system. Since logs are used for identifying or characterizing attacks as described, by correlating reports as described and matching them with known attack patterns, server 210 may gain insights based on reports from a plurality of security components as described, e.g., identify an attack, identify a source, determine which components in a vehicle are attacked and so on.

Correlation may be according to time. For example, server 210 may correlate reports from a plurality of DCUs (in a respective plurality of vehicles) by examining portions of the reports that relate to a specific time interval and look for events that occurred at the same time or same time interval. For example, using time correlation, server 210 may detect that a specific, same ECU (e.g., an ECU that controls the infotainment system) in several vehicles stopped reporting between 10:32:45 (HH:MM:SS) and 10:36:24, in such case, server 210 may determine that the ECU that controls the infotainment system in the vehicles has been attacked or hacked. Accordingly, by correlating logs or reports as described, server 210 may identify a cyber threat.

Correlation may be according to location. For example, server 210 may correlate reports from a plurality of DCUs in a respective plurality of vehicles that are in the same geographic location. For example, an attack launched over WiFi may be localized, by correlating or comparing logs or reports from vehicles received when the vehicles are, or were, in a specific area (although at different times), server 210 may detect that, when vehicles are in a specific area, no information from an ECU that controls the air conditioning system is included in reports from the vehicles, in such case, based on correlating reports according to a location, server 210 may identify or determine where an attacker is located.

Correlation as described may be according to any relevant aspect. For example, server 210 may correlate (compare, relate or examine together) reports or data from/of vehicles that were serviced at a specific service facility, vehicles that include a component from a specific manufacturer, vehicles that were sold in the last three months and so on. Correlation may include examining reports or data related to a plurality of vehicles and looking for similar patterns or events e.g., according to time, place, specific hardware, specific software or any other aspect as described.

In some embodiments, server 210 may run or execute logic to detect security related events based on aggregated, correlated, grouped and/or fused data. For example, based on weather conditions received from a website and reports of suspected anomalies in some of vehicles 220, server 210 may determine whether or not the suspected anomalies are indeed indicative of an attack or they are a result of severe weather conditions. In another case, based on reports from dealerships or service stations, server 210 may link an attack to vehicles who were serviced at a specific service stations, or specific time, or location. Accordingly, by fusing data from a plurality of sources including sources external to, or other than, vehicles 220, server 210 may provide security related insights that cannot be provided by known systems and methods.

An embodiment may ignore anomalies which are false positive caused by extreme environmental conditions (such as storms, extreme high/low temperature etc.) by for example fusing geolocation with weather data feed. For example, an SEU in a vehicle 220 may provide server 210 with a location of vehicle 220, server 210 may obtain weather information (or condition) for the location, and server 210 may process cyber-security data received from, or related to, vehicle 220, based on the weather condition at the location of vehicle 220. For example, based on weather conditions, server 210 may change thresholds, e.g., such that missed messages are not treated as anomalies (e.g., they are attributed to bad communication resulting from extreme weather conditions) or (possibly a very high frequency of) messages related to exceptional engine temperature (that may otherwise be considered an indication of an anomaly) may be ignored, e.g., attributed to extremely high temperature where vehicle 220 is.

An embodiment may look back at data (e.g., data previously received from vehicles) and correlate historical data with newly identified hacks, to find new, or previously undetected hacking attempts (e.g. attacks not known to a system prior to the detection). For example, server 210 may identify a pattern of messages that indicates, identifies or represents an attack. For example, based on a pattern of messages received from SEUs or a pattern of messages communicated from an ECU on an in-vehicle network in vehicles 220, server 210 may identify an attack. Server 210 may then examine historical data, e.g., a log of messages received from vehicles 220 in the past, look for the pattern in the historical data and thus determine that the attack has occurred in the past. Of course, any cyber-security data may be thus determined, e.g., which vehicles were attacked in the past, when attacks were launched and so on.

An embodiment may analyze or look at entertainment devices logs at time of attacks across multiple vehicles to identify common media (e.g., CD, File, etc.) as a suggested attack vector. For example, aggregated data 131 may include messages received from entertainment devices in hundreds or thousands of vehicles 220, accordingly, having determined an attack took place between 14:00 and 17:00 at a specific date, server 210 may check or examine messages received during that time from entertainment devices in a fleet and identify a pattern or an attribute. For example, a hacker may gain access to an in-vehicle network by hacking into the infotainment system of the vehicle and may send messages from the infotainment system to other ECUs and/or to an external node. Accordingly, an attack may be characterized by a frequency, pattern, type or other attributes of messages related to an infotainment system. Accordingly, server 210 may characterize attacks based on examination of aggregated data 131 that may include historical data for fleet 220.

An embodiment may look at connectivity devices visibility (not necessarily paired) logs at time of attacks across multiple vehicles to identify common devices (smartphone, dongles etc.) as a suggested attack vector. For example, aggregated data 131 may include information that identifies devices such as smartphones or other wireless communication devices or information that identifies dongles, keys etc. that were in communication with an attacked vehicle. Accordingly, an attack may be characterized based on the communication or interaction with external devices. For example, if a substantial number of vehicles in fleet 220 that were attacked during a specific time or specific attack are found to have been visible to an external communication device (e.g., characterized by a type, a communication method or platform) shortly before or during, the attack then server 210 may add the device type and/or communication method or platform (or information related thereto) to an attack vector. An attack vector may be any set of values, parameters or data pieces that identifies an attack.

An embodiment may look at connectivity devices pairing logs at time of attacks across multiple vehicles to identify common devices (smartphone/dongle/etc.) as a suggested attack vector. For example, if a substantial subset (e.g., a majority or more than a predefined percentage) of vehicles 220 that were attacked during a specific time or specific attack are found to have been communicating with an external communication device or platform (e.g., characterized by a device type or number or otherwise) shortly before or during, the attack then server 210 may add the external device or the platform (or information related thereto) to an attack vector. An attack vector may be any set of values, parameters or data pieces that identifies an attack.

An embodiment may group multiple events based on geographical current or previous location to understand if it was a localized attack and possible attack vector (based on range—BLUETOOTH short-range wireless technology VS cellular). For example, based on aggregated data 131 that may include geolocation data of attacked vehicles, server 210 may identify or determine a geographical location of an attack.

An embodiment may fuse vehicle logs with accidents database (DB). For example, if there is an unlikely pattern shared by some cars that were involved in accidents, this could be a covert attack. An accidents DB may be any database, online or other source that may include or provide information related to accidents, e.g., location and time of accidents, identifications of vehicles involved (e.g., plate numbers) and so on. Identifying a specific pattern of messages destined to and/or originating from, a set of vehicles involved in an accident may be used by server 210 to identify an attack that took place when or where an accident occurred.

An embodiment may fuse the geolocation or connectivity logs of multiple hacks to understand if they might be using the same cell tower. For example, server 210 may use geolocation information in aggregated data 131 and other data (e.g., source destination of messages) to determine that an attacker used a specific cell tower.

An embodiment may fuse service and dealership logs to understand if a substantial subset of vehicles affected cars were serviced in the same dealership—to indicate a service/dealership originating attack. For example, aggregated data 131 may include logs of service operations or procedures, e.g., identification of a service station, garage or dealership, time of service, ECUs or other components replaced or serviced and so on. Accordingly, by noting that a substantial subset of vehicles sold by a specific dealership or a substantial subset of vehicles serviced by a specific garage were attacked by a specific attacker or method, server 210 may link or connect a service station, garage or dealership to an attack.

An embodiment may fuse ECU manufacturing DB to understand if a substantial number of affected cars have ECUs manufactured at the same factory—to indicate a supply chain attack. For example, manufacturing DB may include, for ECUs, an identification of a manufacturer, a manufacturing date and so on, by combining information in a manufacturing DB with data in aggregated data 131 (that may include attack vectors), server 210 may identify that a specific manufacturer or that ECUs manufactured at a specific time window or at a specific factory are susceptible to attacks or that the specific ECUs are jeopardized, e.g., malicious software was included in these ECUs during manufacturing.

An embodiment may aggregate a list of open source components each ECU has and cross compare to find known vulnerability databases. Open source components may be components that include open source software. For example, by relating information indicating attacks to the type, source or other aspect of open source software in ECUs included in attacked vehicles, server 210 may identify a specific open source software component that may include malicious software.

An embodiment may remove false positives by comparing with ECU malfunction databases. For example, a malfunction DB (e.g., in server 260) may include messages that provide information regarding possible or actual malfunctions of ECUs in vehicles 220. By relating data in a malfunction DB to aggregated data 131, server 210 may determine that a pattern or other aspect of messages that would otherwise be considered indicative of an attack is actually caused by a faulty component. Accordingly, by relating data in a malfunction DB to aggregated data 131, server 210 may avoid false positives.

An embodiment may provide a query/response mechanism for forensic data of attacks based on collected in-vehicle logs (e.g., logs in vehicles 220 that were not transmitted to server 210). An embodiment may provide backend (e.g., server 210) decision based on logs in vehicles 220. For example, server 210 may receive a query from a user, e.g., when was the last attack on fleet 220? what vehicles in fleet 220 were hit by the attack yesterday? etc. To respond to a query, server 210 may communicate with vehicles 220, receive therefrom data stored in vehicles 220 and generate a response based on received data.

An embodiment may perform offline analysis based on warranty DB to detect warranty fraud. A warranty DB may include any warranty or insurance related data, e.g., expiry time, components and/or events covered and so on. For example, server 210 may use geolocation data, weather information or other data in aggregated data 131 and information in a warranty DB to identify discrepancies. For example, a user may file an insurance claim that relates to a vehicle 220 and to extreme weather conditions at a specific time and location (e.g., a user claims his car was damaged by hail). Server 210 may check aggregated data 131 and determine that the vehicle 220 was at a different location in the specified time or server 210 may determine that the weather was fine at the location and time specified in the insurance claim. Accordingly, an embodiment may identify fraudulent claims.

An embodiment may perform offline analysis based on data in an ECU version DB (e.g., a DB in server 260) to detect common grounds. A version DB in server 260 may include version information for ECUs, e.g., software and/or hardware version numbers or codes as known in the art. For example, by noting that a substantial subset of ECUs attacked in a specific attack are of the same version, Server 210 may identify and alert a vulnerability, e.g., an embodiment may inform a manufacturer that the series or line of ECUs with software version 6.001 are susceptible to an attack and server 210 may further provide data characterizing the attack.

An embodiment may look on vehicle specific logs and find things which might not be indicators alone but due to scope and/or frequency are anomalous from a fleet perspective. For example, a specific message sent over an in-vehicle network may not be considered an anomaly, however, the same specific message sent at approximately the same time, over an in-vehicle networks in a plurality of vehicles may be an indication of an attack. For example, if at the same time, an infotainment system in hundreds of vehicles sends a specific message then server 210 may determine that this is an anomaly.

An embodiment may look, e.g., in reports 133 and/or server logs 132 for several vehicles with some of the log data being continuous and some not. An increase of the number of vehicles may suggest an active attack causing ECU's to malfunction or crash. For example, server 210 may identify, determine or realize that, at time 10:00, no data is added to logs in five vehicles 220, at time 10:05, no data is added to logs in additional fifteen vehicles and the number of vehicles that do not log activity is now twenty. Upon identifying a rise in the number of vehicles that fail to log activity, server 210 may determine an attack is in progress. Of course, identifying an attack that occurred in the past may be done by identifying that, in the past, the number of vehicles not logging activity rose as described.

An embodiment may look for indicators of a hack in standard vehicle operation logs. Any logs in vehicles may be created, e.g., logs including number, type, frequencies and other attributes of messages or events may be maintained in each of vehicles 220. Data in logs in vehicles may be processed by server 210 and/or by a unit in each vehicle in the same way aggregated data 131 is processed as described herein.

An embodiment may look for common internet protocol (IP) addresses in multiple vehicles communications logs (on-board or from an internet service provider (ISP) or OEM) and look for common suspicious IP addresses to detect threat source. For example, logs in vehicles and/or aggregated data 131 may include, for some, for a majority, or even for all messages, the source and destination IP addresses of messages sent or received by vehicles 220. Accordingly, a specific source of messages may be linked to an attack, e.g., if it is seen that a substantial subset of vehicles attacked have, during a time window related to the attack, received messages from a specific source (e.g., a specific IP address) then that specific source may be linked to the attack, e.g., considered the source of, or participant in, the attack.

An embodiment may look at installed apps of multiple cars to identify if attacks are from the same app. For example, aggregated data 131 may include, for each vehicle 220, a list of applications installed in the vehicle. Having identified a set of vehicles attacked in a specific attack, server 210 may check the lists of applications installed in these vehicles and identify one or more applications installed in a substantial subset of these vehicles, such applications may be linked to the attack, e.g., they may be suspected as containing malicious software. For example, these applications may be blacklisted or otherwise marked.

An embodiment may look at connectivity services of multiple cars to identify if attacks are from the same provider. For example, if server 210 identifies that the same ISP provides services to a set of vehicles 220, all (or most) of which were attacked at the same time, by the same attack or same attacker then server 210 may link the ISP to the attack or attacker. Accordingly, global aspects related to attacks may be revealed by an embodiment. It is noted that by creating and processing logs or other data in a single vehicle, global aspects such as those described herein cannot be identified or revealed. An embodiment may look at communication logs of multiple cars to identify if attacks are from the same place. For example, using geolocation in aggregated data 131 as described, server 210 may determine the place of an attack.

An embodiment may log and examine network transmission aspects and, based on a characteristic, event, phenomena or other aspect, identify an attack. For example, server 210 or vehicle 220 may log the number of rejected transmission control protocol (TCP) packets due to bad sequence number. If the number rises for several vehicles 220 at the same location or time, server 210 or vehicle 220 may determine that this is a failed TCP sequence prediction attack, or other attack.

An embodiment may provide live or real-time mirroring mechanism for forensic data of attacks thus enabling detecting attacks in real time. For example, data may be provided from vehicles 220 to server 210 in real-time, and server 210 may process received data in real-time. The term "real-time" (also known referred to in the art as "realtime", or "real time") as referred to herein generally relates to processing or handling of events at the rate or pace that the events occur or received (possibly defined by human perception). For example, a system according to embodiments of the invention may process events in a vehicle or messages sent over an in-vehicle network in real-time, e.g., within milliseconds or other very brief periods so that analysis of messages and events as described herein is done, and results are made available or achieved virtually immediately. For example, a system may process messages and events related to vehicles 220 in real-time, at the rate that the events occur, or the messages are sent or received.

An embodiment may identify a vehicle's state or context in time of attack (e.g., speed, ABS working, ADAS, etc.) to investigate if a certain state is common to attacks or might trigger it. For example, based on data in aggregated data 131 and/or based on messages received from vehicles 220, server 210 may identify, with respect to a specific attack, specific attacker or specific attack type, the ABS system in a majority of (or even all) attacked vehicles was not working or the engine heat was increasing rapidly and so on. Accordingly, an embodiment may link or associate an attack (or attacker, or attack type) with a state, condition or context of vehicles such that based on state, condition or context, an attack may be identified or even predicted. Additionally, vulnerabilities may be identified. For example, by linking attacks to states as described, it may be discovered that, when a vehicle is in a specific state or condition, a specific ECU is vulnerable or is susceptible to attack.

An embodiment may identify source of attack based on comparison to existing Firmware Over-The-Air (FOTA) logs. For example, if server 210 identifies that a specific software component (e.g., firmware) has been updated in a set of vehicles that were subsequently attacked by a specific attack then server 210 may link the firmware to the specific attack, e.g., determine that the updated firmware is the source of the attack or that it contains a vulnerability.

An embodiment may group similar attacks by sequence of anomalies to identify if coming from the same source. For example, server 210 may examine logs related to attacks, identify therein similar aspects, e.g., similar anomalies such as frequency of messages, types or errors, similar timing or content sequences or other attributes of messages and associate attacks that exhibit similar attributes to a specific source (e.g., to a specific attacker).

An embodiment may group attacks together based on an OEM ownership DB to determine attack target or researcher identity. For example, using aggregated data 131 and data in a DB that includes data that identifies a manufacturers or OEMs of components, server 210 may realize that the components form the same OEM are installed in a substantial subset of vehicles that were attacked in a set of attacks. Accordingly, server 210 may group, associate or link attacks to a specific OEM or manufacturer of components.

An embodiment may fuse the vehicle and components types/manufacturers with "cyber intelligence" feeds to understand if they correlate. For example, statistical or other computations may be applied to the number, type or any other attributes of components installed in fleet 220 and may further be compared, correlated or related to any cyber intelligence information thus verifying the intelligence.

An embodiment may fuse suspicious IP activity and/or call logs with ECU logs to find potential suspicious activity originated from the telematics mobile network. For example, IP addresses, telephone numbers used for communicating with components in vehicle 220 as recorded in logs may be used for linking entities with attacks. Other IP activity may be type of messages sent/received during, before or after an attack etc.

An embodiment may fuse location of service access with dealership locations to identify if someone is tuning the vehicle or doing a hack. For example, geolocation data in aggregated data 131 may be used to link a dealership to an attack. In another case, if a location of a dealership is known and an access to an in-vehicle network, during a service procedure provided by the dealership, is made from a location that is remote or distant from the location of the dealership, then server 210 may determine that an attack is in progress. Of course, based on aggregated data 131, server 210 may use similar methods to identify an attack that occurred in the past.

An embodiment may compare communication logs in a server and in a vehicle to identify inconsistencies that might suggest an attack. For example, if a log in sever 210 records a communication of a message but the log in the vehicle does not then an embodiment may determine that the vehicle was attacked (e.g., the attacker modified the log or prevented logging the message). Any other discrepancies or mismatches between logs or aggregated data 131 in a server and logs or data stored locally on vehicles may be used for identifying attacks.

An embodiment may collect ECU operational data (e.g., boot time etc.) to decide if a hack is in progress with no anomalies. For example, aggregated data 131 may include an average boot time of components in vehicles 220 and, if a boot time of a component is above a threshold then server 210 or a unit in a vehicle 220 may determine that an attack was launched on the vehicle.

An embodiment may fuse any data coming from any one or more components in a vehicle 220. For example, an embodiment may fuse data coming from different cyber components in the car, e.g., an embodiment may detect an attack on a substantial subset of vehicles based on similar errors in a hardware security module (HSM) components or secure on-board communication mechanism.

A system and method of tracking a manufacturing source of a jeopardized component, may include, in a plurality of in-vehicle components, a respective plurality of codes identifying the manufacturing entities of the components; receive security related reports from at least some of the components, the reports including codes identifying the manufacturing entities; and use the received codes to associate a manufacturer of an in-vehicle component with a cyber threat. For example, based on codes provided to components in vehicles 220, e.g., codes included in messages sent by components, (for example, codes included in components, by the manufacturers of the components) and using the manufacturing DB as described herein, server 210 may identify manufacturers as described.

An embodiment may include, in at least some of a plurality of in-vehicle components, codes identifying respective service entities; and the embodiment may use codes received in reports to associate a service entity with a cyber threat. An embodiment may include, in the reports, geolocation information; and the embodiment may use the geolocation information to associate a cyber threat with a communication entity.

An embodiment may include, in reports, connectivity information; and the embodiment may use the connectivity information to associate a cyber threat with a communication entity. An embodiment may receive data related to environmental conditions in a location and use the geolocation information and the data to avoid falsely identifying a security breach.

As described, a system according to some embodiments includes a server 210 and a plurality of DCUs 221 installed in a respective plurality of vehicles in a fleet of vehicles. In some embodiments, to provide fleet cyber-security, DCUs 221 are adapted to collect information related to cyber security and to include the information in reports sent to server 210. For example, reports from DCUs may be stored by server 210 as shown by reports 133 and reports 133 may be used to produce aggregated data 131.

In some embodiments, server 210 is adapted to aggregate reports 133 received from the plurality of DCUs to create aggregated data 131 and identify, based on aggregated data 131, that the fleet and/or a vehicle in the fleet is under a cyber-attack or under a cyber-threat.

For example, server 210 may aggregate reports 133 received from two or more DCUs 221 to produce aggregated data 131 and, based on aggregated data 131, server 210 may identify an attack or a cyber-threat. For example, if based on aggregated data 131, server 210 detects that a plurality of DCUs report, at the same time, a fault in an infotainment unit, then server 210 may deduce that the reports 133 are related to a cyber-attack and not to a malfunction since it is unlikely that a large number of infotainment units all malfunction at the same time. Server 210 may analyze aggregated data 131 according to various aspects, e.g., time, location, weather, data communicated to and from vehicles, context or state of vehicles etc. For example, reports from a plurality of DCUs in a specific location or geographic area may be correlated to identify cyber threats (or false positives as further described), reports from DCUs in areas with similar weather conditions may be correlated or examined together in order to identify cyber-threats and/or identify false positives, reports from vehicles traveling at similar speeds may be compared using reports 133 and/or aggregated data 131 and so on.

The terms "vehicle context", "network context", "nodes context" or simply "context" as referred to herein may relate to a state, configuration or any operational or functional aspects of one or more of: a vehicle, an in-vehicle network, and/or one or more nodes connected to the in-vehicle network. Context and repetition period are further described herein below.

Context, vehicle context or context of a vehicle (e.g., context of vehicle 220) as referred to herein may relate to a state of the vehicle, a state of the vehicle's in-vehicle communication network and/or a state of nodes connected to an in-vehicle communication network. For example, a state or context of vehicle 220 may be defined or determined, e.g., by server 210, responsive to a value for each of at least one parameter, which one or more DCUs in the vehicle provides in a report. For example, reports 133 may include any combination of more than one of, vehicle's speed, acceleration, closing speed to a leading or trailing vehicle, engine revolutions per minute (rpm), engine temperature, oil pressure, hydraulic pressure, wheel traction, road condition, vehicle location (e.g., provided by a GPS unit in the vehicle), and/or weather condition. State or context of a vehicle or an in-vehicle network may by way of example, be defined (e.g., by server 210) responsive to reports 133 that include which types of messages are being transmitted over a network, and/or which nodes in in-vehicle communication network are actively communicating over the network.

A context or state may be related to ECUs, nodes or components in a vehicle, e.g., an operational stage or phase of an ECU (e.g., the ECU is rebooting, in an initialization sage, restarting, being updated and so on). Accordingly, server 210 may determine, detect or identify a context or state of vehicles based on reports. For example, reports 133 may include some, or even all, messages sent over an in-vehicle network, thus server 210 may know, or determine or identify, the state of the vehicle itself, as well as the state or context of any one of the nodes connected to an in-vehicle network.

In some embodiments, identifying a cyber-attack is based on correlating information in reports 133 with data stored on the server, e.g., correlating information in reports 133 with server data 135. For example, server data 135 may be, or may include data from, a manufacturing DB, a warranty DB, a version DB and/or an OEM ownership DB. By correlating information in reports 133 with information in DBs such as those mentioned herein, server 210 may identify a cyber-attack or cyber threat. For example, a mismatch of data or values related to components in a vehicle (e.g., model number, firmware version) with expected data or values (e.g., expected based on data in a DB as described) may lead server 210 to determine an attack is in progress.

In some embodiments, identifying a cyber-attack is based on correlating information in in reports 133 with logs, e.g., correlating information in reports 133 with server logs 132. Specifically, server logs 132 may include information related to a communication of DCUs with server 210, e.g., when communication was established or made, what type of data or report was communicated and so on. As described, server logs 132 may include historical data. Accordingly, by comparing, relating or correlating data received from vehicles 220 in the past, server 210 may find patterns and use such patterns to identify an attack or threat.

In some embodiments, server 210 is adapted to identify a cyber-attack or cyber-threat based on aggregating reports from at least one of: a dealership, a service facility and a component in at least one of the vehicles. For example, server 210 may aggregate or correlate data in reports 133 with information received from dealership 250 and/or with data received from service entity 240. For example, server 210 may identify that vehicles serviced at a specific service location all exhibit similar behavior, e.g., DCUs in these vehicles report errors or report suspicious events. Accordingly, server 210 may link a cyber-attack or threat to a specific service entity or dealership.

In some embodiments, DCUs 221 are adapted to include, in the reports, codes identifying service entities; and server 210 is adapted to use the received codes to associate a service entity with a cyber threat. For a code uniquely identifying a manufacturer or service location or facility may be included in reports 133 as described thus enabling server 210 to associate a dealer or service facility with a cyber threat or attack. For example, using codes in reports, server 210 may identify that many or even all DCUs in vehicles serviced at a specific garage report suspicious events and may thus determine that an attack that originates at the specific garage is under way.

In some embodiments, server 210 classifies an event (or a sequence of events) based on relating the event or sequence to one or more recorded events and server 210 identifies a cyber-attack based on the classification.

When receiving events or sequences of events from DCUs, server 210 may relate, correlate or compare the events or sequences to known or classified events or sequences and thus classify received events. Events or sequences already recorded in server 210 may be classified, e.g., based on input from a user or otherwise. For example, after identifying an attack as described, server 210 may automatically classify a set of events (e.g., a set that preceded the attack) as related to risk, threat and attack. Accordingly, server 210 may automatically learn how to classify events or sequences and may then use classifications of events or sequences to detect cyber attacks or threats as described.

Classifying an attack may include determining the type of the attack or it may include classifying a type of false positive. For example, a classification may be according to the component or vulnerability, e.g., a first class of attacks may be attacks that target the engine of a vehicle, a second class may be, or include, attacks that target the infotainment system, a third class of attacks may be or may include attacks that exploit a vulnerability in an operating system (e.g., a specific version of the Linux OS in ECUs) and so on. A classification of an attack may be according to the effect or severity of the attack, e.g., a first class may include attacks that only enable an attacker to retrieve data from a vehicle and a second class may be attacks that provide an attacker with control over the vehicle. For example, a classification of an attack may include associating the attack with a set of known attacks. For example, an attack may be classified based on a specific exploitation of one or more known vulnerabilities. A classification of an attack may be based on an effect caused by the attack. For example, a class may be a specific known ransom malware attack that shuts down the infotainment system in a vehicle. A class may include attacks that exploit a specific set of vulnerabilities, e.g., used to disable breaks remotely. A class may be related to a source, e.g., a class of attacks may include attacks which are spread by a specific malicious actor In some embodiments, server 210 is adapted to identify a false positive detection based on the classification. For example, specific events or sequences of events may be classified as legitimate or non-threats, accordingly, although, based on an event, server 210 may otherwise determine a cyber threat or attack is present, based on a classification of the event server 210 may determine that identifying the event as representing a cyber-attack will be a false-positive detection.

In some embodiments, server 210 is adapted to identify previously undetected threats by correlating historical data with newly identified hacks. For example, server 210 may obtain or be provided with (e.g., by a user) data describing cyber attacks (e.g., specific sequences of events known to occur when specific attacks are launched). By correlating data describing attacks with information in reports 133, server logs 132 and/or server data 135, server 210 may identify attacks that occurred in the past. Identifying historical attacks may be desirable, e.g., some attacks may leave malware in attacked vehicles thus, by detecting or identifying that an attack occurred in the past, malware left in vehicles can be detected and removed, another example is identifying sources of historical attacks, e.g., identifying a dealership or service facility wherefrom an attack was launched can help in securing a dealership or service facility such that additional attacks therefrom are prevented.

In some embodiments, server 210 is adapted to identify a cyber-threat based on correlating data received from a plurality of DCUs 221 in a vehicle. For example, if a report from a DCU 221 includes data that the DCU 221 obtained from a first ECU that controls the engine of a vehicle indicating that the engine is not running, and the report also includes data from a second ECU indicating the vehicle is traveling at 30 mph then, by correlating the information from the first and second ECUs (and applying a rule), server 210 identifies an anomaly and may determine the vehicle is under attack. Any rule, criteria or logic may be used by server 210 when correlating data as described herein. For example, server 210 may use predefined sequences of events that, when detected, indicate an anomaly or a cyber-threat or attack. In other cases, sets of events that, if seen together, e.g., occur at the same time or within a predefined time interval are defined and used for identifying cyber-threats, e.g., if a first and second predefined events occur within a time interval of 20 milliseconds (ms) then server 210 may determine an attack is in progress.

In some embodiments, DCUs 221 are adapted to include, in reports provided to server 210, geolocation information and server 210 is adapted to use the geolocation information to associate a cyber threat with a location. In some embodiments, DCUs 221 are adapted to include, in reports provided to server 210, connectivity information and server 210 is adapted to use connectivity information to associate a cyber threat with a communication entity. For example, using connectivity information that includes an identification of a communication tower or antenna, a carrier or other infrastructure related to communication, server 210 may associate an attack with a specific antenna, cell tower, a WiFi hotspot or carrier. As described, server 210 may be adapted to use geolocation information to avoid falsely identifying a cyber threat, e.g., if server 210 is informed of a storm in a specific area then server 210 may ignore corrupted messages received from vehicles in the area (rather than determine corrupted messages are a result of an attack).

Figure 3:
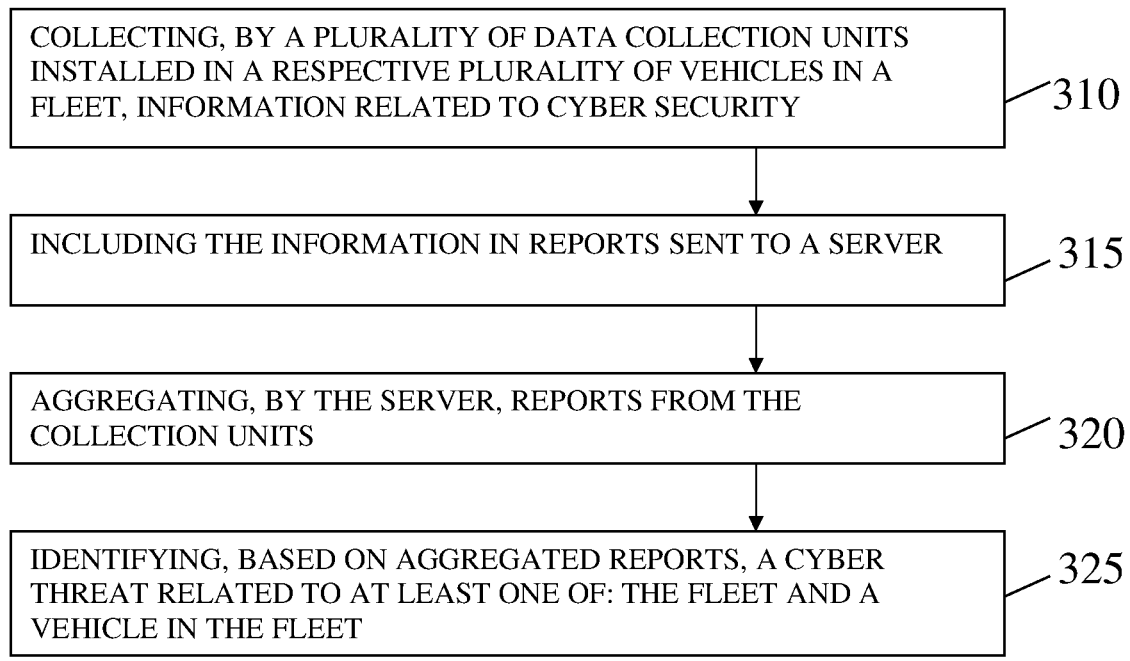
FIG. 3 shows a flowchart of a method according to illustrative embodiments of the present invention.

Reference is made to FIG. 3, a flow according to some embodiments of the present invention. As shown by block 310 information related to cyber security may be collected or obtained by a plurality of units. For example, a plurality of DCUs 221 may collect information related to cyber security vehicles 220 as described. As shown by block 315, the information may be included in reports sent to a server. For example, DCUs 221 may send reports that include collected information to server 210 as described.

As shown by block 320, information in reports may be aggregated. For example, server 210 may aggregate information in reports from DCUs 221 to produce aggregated data 131. As shown by block 325, a cyber threat may be identified based on aggregated reports. For example, server 210 may identify a cyber attack or other threat based on aggregated data 131 as described.

In one embodiment, a unit such as server 210 may perform one or more actions if or when an attack is detected or identified as described. For example, server 210 may send a message (e.g., an electronic mail (email) or a Short Message Service (SMS) message) to a predefined list of recipients informing the recipients of the attack, possibly including in the message any relevant information, e.g., where the attack took (or takes) place, which vehicles are or were affected and so on. An action taken by server 210 may include communicating with the driver of an attacked vehicle, with a dealership, service facility and/or a relevant authority.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for providing cyber-security to a fleet of vehicles, the system comprising:
   a server included in a security operations center (SOC) managing cyber-security of the fleet, the server comprising:
      a memory; and
      a processor adapted to:
         receive from a plurality of data collection units (DCUs) installed in a respective plurality of vehicles in the fleet, a plurality of reports, the reports including information collected by the DCUs and related to cyber security;
         correlate information received from a first DCU installed in a first vehicle with information received from a second DCU installed in a second vehicle that is separate from the first vehicle,
         based on the correlation, identify at least one of:
            a common time of an occurrence of a common event,
            a common geographic place,
            a common component included in the vehicles,
            a common service facility,
            a common manufacturer of a common element,
            a common source of network messages, and
            an attribute which is common to a plurality of vehicles in the fleet; and
         based on the identification, determine that at least one of the fleet and a vehicle in the fleet is under a cyber-attack.

2. The system of claim 1, wherein determining that at least one of the fleet and a vehicle in the fleet is under a cyber-attack is based on at least one of:
   correlating information in the reports with data stored on the server; and
   correlating information in the reports with server logs related to a communication of DCUs with the server.

3. The system of claim 1, wherein the server is adapted to identify the cyber-attack based on reports from at least one of: a dealership, a service facility and a component in at least one of the vehicles.

4. The system of claim 1, wherein:
   the DCUs are adapted to include, in the reports, codes identifying service entities; and
   the server is adapted to use the received codes to associate a service entity with a cyber threat.

5. The system of claim 1, wherein the server is adapted to:
   classify an event based on relating the event to one or more recorded events; and
   identify a cyber-attack based on the classification.

6. The system of claim 5, wherein the server is adapted to identify a false positive detection based on the classification.

7. The system of claim 1, wherein the server is adapted to identify previously undetected threats by correlating historical data with newly identified hacks.

8. The system of claim 1, wherein the server is adapted to identify a cyber-threat based on correlating data received from a plurality of DCUs in a vehicle.

9. A method of providing cyber-security to a fleet of vehicles, the method comprising:
examining, by a server included in a security operations center (SOC) managing cyber-security of the fleet, data in reports received from a plurality of data collection units (DCUs), the DCUs installed in a respective plurality of vehicles in the fleet, the reports including information related to cyber security; and
determining that at least one of the fleet and a vehicle in the fleet is under a cyber-attack based on:
correlating data received from a first DCU installed in a first vehicle with data received from a second DCU installed in a second vehicle that is separate from the first vehicle, and
based on the correlation, identifying at least one of:
a common time of an occurrence of a common event,
a common geographic place,
a common component included in the respective vehicles,
a common service facility,
a common manufacturer of a common element,
a common source of network messages, and
an attribute which is common to a plurality of vehicles in the fleet; and
based on the identification, determining that at least one of the fleet and a vehicle in the fleet is under a cyber-attack.

10. The method of claim 9, wherein determining that at least one of the fleet and a vehicle in the fleet is under a cyber-attack is based on at least one of:
correlating information in the reports with data stored on the server; and
correlating information in the reports with server logs related to a communication of DCUs with the server.

11. The method of claim 9, comprising identify the cyber-attack based on aggregating reports from at least one of: a dealership, a service facility and a component in at least one of the vehicles.

12. The method of claim 9, comprising:
including, in the reports, codes identifying service entities; and
using the received codes to associate a service entity with a cyber threat.

13. The method of claim 9, comprising:
classifying, by the server, an event based on relating the event to one or more recorded events; and
identifying a cyber-attack based on the classification.

14. The method of claim 13, comprising identifying a false positive detection based on the classification.

15. The method of claim 9, comprising identifying previously undetected threats by correlating historical data with newly identified hacks.

16. The method of claim 9, comprising identifying a cyber-threat based on correlating data received from a plurality of DCUs in a vehicle.

17. The method of claim 9, comprising:
including, in the reports, geolocation information; and
using the geolocation information to associate a cyber threat with a location.

18. The method of claim 9, comprising:
including, in the reports, connectivity information; and
using the connectivity information to associate a cyber threat with a communication entity.

19. The method of claim 9, comprising:
including, in the reports, weather conditions; and
using the weather conditions to identify false positive detection.

20. A method of providing cyber-security to a fleet of vehicles, the method comprising:
obtaining, by a set of sensors units installed in a respective set of vehicles in the fleet, data related to cyber security and sending the data to a server included in a security operations center (SOC) managing cyber-security of the fleet; and
correlating data received from a first set of sensor units installed in a first vehicle with data received from a second set of sensor units installed in a second vehicle that is separate from the first vehicle, and
based on the correlation, identifying at least one of:
a common time of an occurrence of a common event,
a common geographic place,
a common component included in the vehicles,
a common service facility,
a common manufacturer of a common element, a specific source of network messages, and
an attribute which is common to a plurality of vehicles in the fleet; and
based on the identification, determining that at least one of the fleet and a vehicle in the fleet is under a cyber-attack.

* * * * *